United States Patent [19]

Hsu

[11] Patent Number: 5,411,895
[45] Date of Patent: May 2, 1995

[54] HYBRID MULTIPLE QUANTUM WELL SPATIAL LIGHT MODULATOR

[75] Inventor: Tsung-Yuan Hsu, Westlake Village, Calif.

[73] Assignee: The United States of America as represented by the Secretary of the Air Force, Washington, D.C.

[21] Appl. No.: 419,403

[22] Filed: Oct. 10, 1989

[51] Int. Cl.[6] .......................................... H01L 31/18
[52] U.S. Cl. ........................................ 437/3; 437/5; 385/27
[58] Field of Search ................... 350/96.14; 437/3, 5; 385/27

[56] References Cited

U.S. PATENT DOCUMENTS

| 4,525,687 | 6/1985 | Chemla et al. | 357/16 X |
| 4,642,413 | 2/1987 | Ovshinsky | 136/249 |
| 4,685,763 | 8/1987 | Tada et al. | 350/96.14 |
| 4,696,533 | 9/1987 | Kingston et al. | 350/96.14 |
| 4,713,493 | 12/1987 | Ovshinsky | 136/249 |
| 4,737,003 | 4/1988 | Matsumura et al. | 350/96.14 |
| 4,904,045 | 2/1990 | Alferness et al. | 350/96.19 |

Primary Examiner—Peter A. Nelson
Attorney, Agent, or Firm—Bobby D. Scearce; Donald J. Singer

[57] ABSTRACT

A method for fabricating a hybrid MQW spatial light modulator is described which comprises steps of depositing on a substrate in sequence a first layer to preselected thickness of n+ (or p+) semiconductor material, a second layer to preselected thickness of intrinsic semiconductor material and a third layer to preselected thickness of p+ (or n+) semiconductor material to form a modulator portion, applying a metallic layer defining a mirrored surface to the third layer of the modulator portion, providing a prefabricated silicon PIN detector having a layered structure including an intrinsic layer of preselected thickness sandwiched between an n+ layer and p+ layer of respective preselected thicknesses and joining the PIN detector to the mirrored surface using a conductive adhesive layer, selectively boring channels into the modulator portion to preselected depth into the PIN detector to form an array of a plurality of pixels on the modulator portion, filling the channels with light blocking material, and applying electrodes to the PIN detector and modulator portion.

7 Claims, 1 Drawing Sheet

HYBRID MULTIPLE QUANTUM WELL SPATIAL LIGHT MODULATOR

RIGHTS OF THE GOVERNMENT

The invention described herein may be manufactured and used by or for the Government of the United States for all Governmental purposes without the payment of any royalty.

BACKGROUND OF THE INVENTION

The present invention relates generally to spatial light modulators, and more particularly to a method for fabricating a hybrid multiple quantum well (MQW) based spatial light modulator.

The MQW spatial light modulator is a potentially high speed modulator for optical signal processing, adaptive optics and infrared to visible conversion applications. Existing MQW spatial light modulator devices are monolithic, which imposes severe limitations on material selection and device fabrication, and usually incorporate submicron grids as reflecting mirrors, which allows light leakage resulting from polarization state variation. An alternative device includes a dielectric mirror which has the disadvantage advantage of both incident angle and operating wavelength dependence. The present invention provides a method for fabricating a hybrid MQW based spatial light modulator wherein an MQW modulator and driver are fabricated separately, so that any high temperature processing steps in the fabrication of either will not adversely affect the structure or operation of the other, and then assembled with a mirror therebetween deposited on a surface of the MQW modulator to minimize light leakage in the assembly. The modulator and driver are then pixelized in the assembled condition to provide lateral resolution to the assembly and to avoid alignment problems in the assembly process. A modulator device according to the method described herein can be fabricated from different material systems such as a silicon driver and GaAs/GaAlAs modulator, unlike the monolithic structure which normally requires the same material system to achieve lattice match. The invention can be operated at extremely high speed (greater than one GHz) at medium voltage (less than 100 volts), which operating characteristics are not available in other known types of spatial light modulators.

It is therefore a principal object of the invention to provide a method for fabricating an MQW based spatial light modulator.

It is a further object of the invention to provide a method for fabricating a MQW spatial light modulator comprising an assembly of a modulator and photodriver.

These and other objects of the invention will become apparent as the detailed description of representative embodiments proceeds.

SUMMARY OF THE INVENTION

In accordance with the foregoing principles and objects of the invention, a method for fabricating a hybrid MQW spatial light modulator is described which comprises the steps of depositing on a substrate in sequence a first layer to preselected thickness of n+ (or p+) semiconductor material, a second layer to preselected thickness of intrinsic semiconductor material and a third layer to preselected thickness of p+ (or n+) semiconductor material to form a modulator portion, applying a metallic layer defining a mirrored surface to the third layer of the modulator portion, providing a prefabricated silicon PIN detector having a layered structure including an intrinsic layer of preselected thickness sandwiched between an n+ layer and p+ layer of respective preselected thicknesses and joining the PIN detector to the mirrored surface using a conductive adhesive layer, selectively boring channels into the modulator portion to preselected depth into the PIN detector to form an array of a plurality of pixels on the modulator portion, filling the channels with light blocking material, and applying electrodes to the PIN detector and modulator portion.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
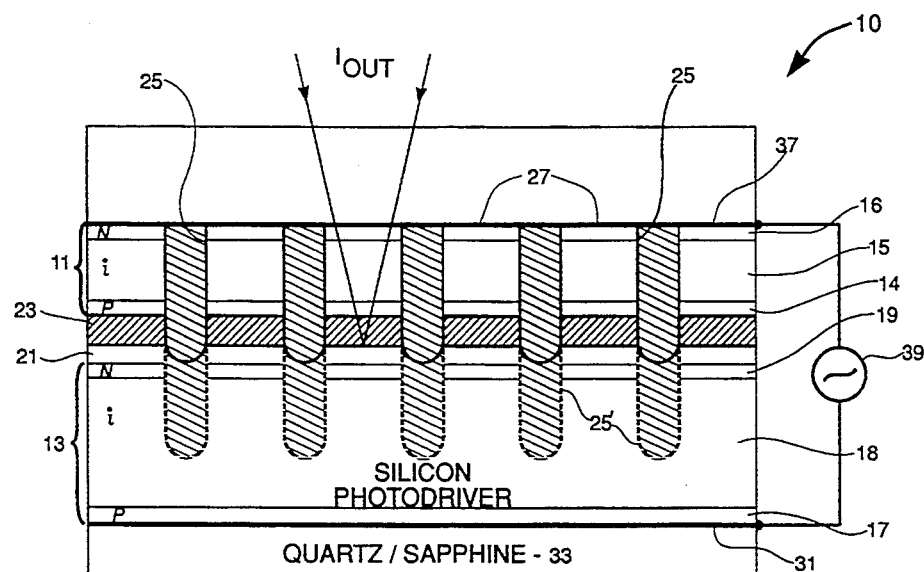
FIG. 1 shows in schematic cross section a hybrid MQW spatial light modulator fabricated according to the invention.
Figure 2:
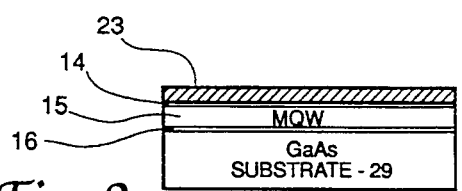
FIGS. 2–7 show six intermediate structures formed in the performance of the fabricating steps for a hybrid MQW spatial light modulator according to the invention.

Referring now to FIG. 1, shown therein in schematic cross section is a hybrid photoactivated MQW spatial light modulator 10 fabricated according to the method described here. In assembled form as shown in FIG. 1, modulator 10 comprises a MQW modulator 11 joined to a silicon photodriver or PIN detector 13. Modulator 11 and photodriver 13 each comprise respective PIN layers 14,15,16 and 17,18,19 for individual operation in substantially conventional fashion. Modulator 11 and photodriver 13 may be joined as at layer 21 using indium solder or conductive epoxy or the like as would occur to one skilled in the applicable art to form a structure as suggested in FIG. 1. Metallic mirror 23 of aluminum, chromium, silver or other suitable metal is deposited to a surface of modulator 11 to serve as a reflector and to minimize light leakage and voltage drop across the juncture of modulator 11 and photodriver 13. Modulator 11 and photodriver 13 are preferably fabricated separately and joined according to these teachings, which greatly reduces the complexity of the structure of modulator 10.

A plurality of light blocking channels 25 defining a corresponding plurality of pixels 27 are provided substantially as shown in order to provide lateral resolution to modulator 10. As more fully explained below, channels 25 are formed in the structure of modulator 10 after joining modulator 11 to photodriver 13 so that no critical alignment is involved in the assembly process.

Referring now to FIGS. 2–7, shown therein are six intermediate structures formed in performing the fabricating steps for a hybrid MQW based spatial light modulator according to the invention. In the fabrication of MQW modulator 11, a PIN structure therein may preferably be formed by growing layer 16 of n+ GaAlAs about one micron thick on an opaque n+ GaAs substrate 29, followed by an intrinsic GaAs/GaAlAs layer 15 of preselected thickness (about 2 to 5 microns) and ending with layer 14 of p+ GaAlAs about 1 micron thick. Alternatively, a p+ layer of semiconductor material may first be deposited on a p+ substrate followed by the intrinsic layer and an n+ layer of semiconductor material. Accordingly, other suitable semiconductor materials for layers 14,15,16 may include InGaAs/InAlAs, InGaAs/GaAs, GaInAs/InP or GaSb/GaAlSb as would occur to the skilled artisan. Any suitable process may be used for growing the PIN structure of modulator 11, molecular beam epitaxy and metal-organic chemical vapor deposition being preferred processes. Metallic mirror 23 is deposited on a surface of MQW modulator 11 at layer 14 after layers 14,15,16 of the PIN structure have been deposited.

Figure 3:
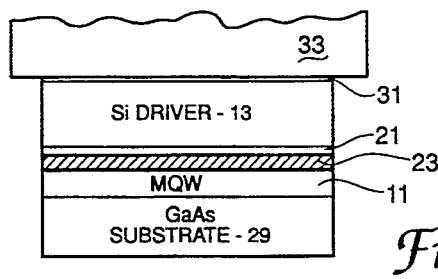

Photodriver 13 may be in the form of a silicon PIN detector prefabricated in manner similar to that described above for MQW modulator 22 comprising a p+ layer about 1.0 to 1.5 microns thick, an intrinsic layer about a few microns to a few tens of microns thick, depending upon the absorption coefficient of the material used and the extent of impedance match to the modulator, and an n+ layer about 1.0 to 1.5 microns thick. PIN detectors comprising materials other than silicon, such as GaAs, PbSe, InSb, or HgCdTe may also be used as would occur to one skilled in the art guided by these teaching. Photodriver 13 is coupled to mirror 23 at indium or conductive epoxy layer 21 as shown in FIG. 3. The n+ layer 19 in driver 13 and p+ layer 14 in MQW modulator 11 ensure minimum voltage drop in the assembled condition with metallic mirror 23 and layer 21 therebetween. Photodriver 13 is then deposited with ITO or other conductor to form a first transparent electrode 31, and secured on sapphire or quartz plate 33 using UV curable cement.

Figure 4:
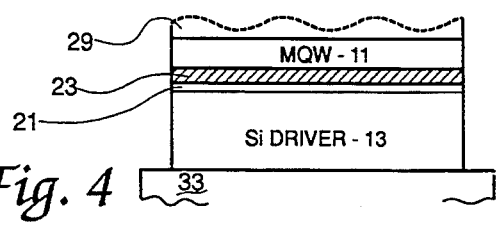
Figure 5:
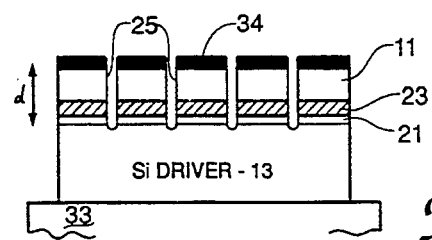
Figure 6:
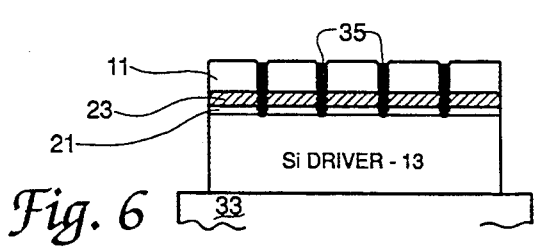
Figure 7:
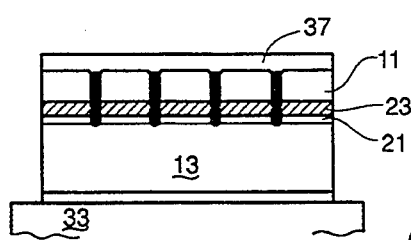

Substrate 29 upon which MQW modulator 11 is grown may then be removed from the GaAlAs layer by conventional selective etching techniques as suggested in FIG. 4, the GaAlAs layer acting as an etch stop layer in the process. Removal of substrate 29 may not be necessary if a transparent substrate is used, such as a structure of GaInAs/GaAs on a GaAs substrate. As suggested above relative to FIG. 1, an assembly of modulator 11 and driver 13 is then pixelized by selectively boring modulator 11 and driver 13 to selected depth to form light blocking channels 25 defining pixels 27. Channels 25 are regularly spaced in any preselected array, are preferably about 2 to 10 microns in width depending upon desired individual pixel size and may be drilled, bored or otherwise formed by any suitable process as is well known in the art, including plasma etching, ion milling, chemical etching, laser boring, photolithography or the like, in certain processes of which photoresist or mask 34 may be utilized. Channels 25 extend through the thickness of modulator 11 and may extend into driver 13 to any selected depth d as illustrated at 25' in FIG. 1. Channels 25 are then filled with light blocking material 35 deposited by suitable process such as spin or sputter deposition; suitable light blocking dielectric materials include platinel (EM Industries) or like polymers. If chemical etching or photolithography is used to form channels 25, deposition of light blocking material 35 is best performed prior to removing etching mask or photoresist 34. ITO or similar conductor may then be deposited on modulator 11 to form a second transparent electrode 37.

In a modulator 10 designed for demonstration of the invention, a 100 microns thick intrinsic layer at a carrier concentration of $10^{12}/cm^3$ in silicon photodriver 13 is expected to be completely depleted at a bias voltage 39 of about 40 V, and a voltage of about 20 V applied directly to the MQW modulator 11 section is required to fully activate modulator 10. At a bias voltage of 20 V, a 4 micron thick 94 angstrom/ 94 angstrom MQW modulator 11 yields a phase shift of about one-half wavelength: the load current (including leakage current) is about 2 mA/cm$^2$ from a 6×6 mm device. A power consumption of 4 mW/cm$^2$ is required to induce a phase change of about one-half wavelength. The optical transmission for this device is considerably low (about 0.25%). When such a modulator is used as an amplitude modulator, an on/off ratio of 100:1 may be expected.

The response time of the MQW modulator 11 portion in the demonstration unit was limited by the capacitance of the device, which showed a response time of about 50 ns for a 6×6 mm device. Reduction in device size can proportionally reduce response time until the contact and parasitic capacitance becomes dominant. A device with a pixel size of 100×100 microns can be operated at a modulation frequency of 1 MHz or more. The response time of silicon driver 13 is limited by the transit time of carriers drifting through the intrinsic region. The photodriver 13 section of the demonstration device may perform to 100 MHz or more. The assembled demonstration device should perform at a modulation frequency of 100 MHz or higher. Modulator 10 may be tailored for operation in virtually any wavelength in the visible to near infrared region.

The resolution of modulator 10 is dependent on available layer deposition technology and assembly technique. High quality MQW structures may be routinely grown on a 2 inch wafer at a uniformity within 2%. A 200×200 array (40,000 elements) with a single pixel size of 100×100 microns can be fabricated on a 1.5×1.5 inch wafer, the actual number of obtainable pixels being dependent on processing technique.

The invention therefore provides a method for fabricating a hybrid MQW based spatial light modulator. It is understood that modifications to the invention as described may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A method for fabricating a hybrid multiple quantum well spatial light modulator, comprising the steps of:
   (a) providing a substrate;
   (b) depositing on said substrate a first layer to preselected thickness of one of n+ P+ and semiconductor material;
   (c) depositing on said first layer a second layer to preselected thickness of intrinsic semiconductor material;
   (d) depositing on said second layer a third layer to preselected thickness of the other of said n+ and p+ semiconductor material, said assembled first, second and third layers comprising a modulator portion of said spatial light modulator;
   (e) depositing on said third layer a metallic layer defining a mirrored surface on said modulator portion;
   (f) providing a prefabricated PIN detector having a layered structure of a layer of intrinsic silicon of preselected thickness sandwiched between an n+ layer of silicon and a p+ layer of respective preselected thicknesses;

(g) joining said n+ layer of said PIN detector to said mirrored surface on said modulator portion using a conductive adhesive layer:

(h) selectively boring channels into said modulator portion to preselected depth into said PIN detector to form an array of a plurality of pixels on the corresponding surface of said modulator portion;

(i) filling said channels with a light blocking material; and (j) applying a first electrode to said PIN detector and a second electrode to said modulator portion at corresponding layers of said PIN detector and said modulator portion.

2. The method of claim 1 wherein said first layer is a semi-conductor material selected from the group consisting of GaAlAs, InAlAs, InP, GaAlSb and GaAs, said second layer is a semiconductor material selected from the group consisting of GaAs/GaAlAs, InGaAs/InAlAs, InGaAs/InP, GaSb/GaAlSb and InGaAs/GaAs and said third layer is a semiconductor material selected from the group consisting of GaAlAs, InAlAs, InP, GaAlSb and GaAs.

3. The method of claim 1 wherein said adhesive conductive layer comprises a material selected from the group consisting of indium solder and conductive epoxy.

4. The method of claim 1 wherein said metallic layer comprises a material selected from the group consisting of aluminum, chromium and silver about 0.2 to 0.3 microns in thickness.

5. The method of claim 1 wherein said first layer is about 1.0 to 1.5 microns in thickness, said second layer is about 2 to 5 microns in thickness and said third layer is about 1.0 to 1.5 microns in thickness.

6. The method of claim 1 wherein said PIN detector comprises a material selected from the group consisting of silicon, GaAs, PbSe, InSb and HgCdTe.

7. The method of claim 1 wherein said channels are about 2 to 10 microns in diameter.

* * * * *